US009761377B2

(12) United States Patent
Nobuta et al.

(10) Patent No.: US 9,761,377 B2
(45) Date of Patent: Sep. 12, 2017

(54) SOLID ELECTROLYTIC CAPACITOR

(71) Applicant: TOKIN Corporation, Sendai-shi, Miyagi (JP)

(72) Inventors: Tomoki Nobuta, Miyagi (JP); Ryuta Kobayakawa, Miyagi (JP); Naoki Takahashi, Miyagi (JP); Yasuhisa Sugawara, Miyagi (JP); Satoshi Suzuki, Miyagi (JP)

(73) Assignee: TOKIN CORPORATION, Sendai-Shi (JP)

( * ) Notice: Subject to any disclaimer, the term of this patent is extended or adjusted under 35 U.S.C. 154(b) by 0 days.

(21) Appl. No.: 14/548,696

(22) Filed: Nov. 20, 2014

(65) Prior Publication Data
US 2015/0077903 A1    Mar. 19, 2015

Related U.S. Application Data

(62) Division of application No. 12/933,817, filed as application No. PCT/JP2009/057348 on Apr. 10, 2009, now abandoned.

(30) Foreign Application Priority Data

Apr. 16, 2008  (JP) ................. 2008-106369

(51) Int. Cl.
*H01G 9/15* (2006.01)
*C08K 5/053* (2006.01)
(Continued)

(52) U.S. Cl.
CPC ............ *H01G 9/025* (2013.01); *C08K 5/053* (2013.01); *C08L 101/12* (2013.01); *H01B 1/127* (2013.01);
(Continued)

(58) Field of Classification Search
None
See application file for complete search history.

(56) References Cited

U.S. PATENT DOCUMENTS 2,468,722 A * 4/1949 Wyler ................... C07C 43/135
528/417
5,790,368 A    8/1998 Naito et al.
(Continued)

FOREIGN PATENT DOCUMENTS

CN    1545713    11/2004
CN    101040002    9/2007
(Continued)

OTHER PUBLICATIONS

International Search Report, PCT/JP2009/057348, Jul. 14, 2009.
(Continued)

*Primary Examiner* — Richard A Huhn
(74) *Attorney, Agent, or Firm* — Young & Thompson

(57) ABSTRACT

An electrically conductive polymer composition has high electrical conductivity, excellent water resistance, high density, and excellent smoothness. Also disclosed is a solid electrolyte capacitor which is prevented from the reduction in electrical conductivity, has low ESR, and also has excellent reliability. Further disclosed is a method for producing the solid electrolyte capacitor. The electrically conductive polymer composition is produced by removing a dispersion medium from an electrically conductive polymer suspension, wherein the electrically conductive polymer suspension includes: an electrically conductive polymer material including a dopant composed of a polyacid or a salt thereof and an electrically conductive polymer; at least one compound (A) selected from erythritol, xylitol and pentaerythritol; and the dispersion medium.

6 Claims, 1 Drawing Sheet

(51) Int. Cl.
  *H01G 9/025* (2006.01)
  *C08L 101/12* (2006.01)
  *H01B 1/12* (2006.01)
  *H01G 9/00* (2006.01)
  *H01G 9/028* (2006.01)
  *H01G 9/042* (2006.01)
  *C08K 5/06* (2006.01)

(52) U.S. Cl.
  CPC .......... *H01B 1/128* (2013.01); *H01G 9/0036* (2013.01); *H01G 9/028* (2013.01); *H01G 9/042* (2013.01); *H01G 9/15* (2013.01); *C08G 2261/3223* (2013.01); *C08K 5/06* (2013.01); *C08K 2201/001* (2013.01)

(56) References Cited

U.S. PATENT DOCUMENTS

| | | | |
|---|---|---|---|
| 6,864,147 B1* | 3/2005 | Fife | H01G 9/0032 438/399 |
| 7,125,764 B2 | 10/2006 | Taketani et al. | |
| 7,377,947 B2 | 5/2008 | Merker | |
| 7,666,326 B2 | 2/2010 | Yoshida et al. | |
| 8,097,184 B2 | 1/2012 | Yoshida et al. | |
| 8,472,165 B2 | 6/2013 | Ning | |
| 2002/0016440 A1* | 2/2002 | Louwet | C08G 61/126 528/373 |
| 2003/0144465 A1 | 7/2003 | Leenders et al. | |
| 2005/0030678 A1 | 2/2005 | Taketani et al. | |
| 2006/0044736 A1 | 3/2006 | Taketani | |
| 2006/0047030 A1 | 3/2006 | Yoshida et al. | |
| 2006/0236531 A1 | 10/2006 | Merker et al. | |
| 2007/0085061 A1 | 4/2007 | Elder et al. | |
| 2009/0021894 A1* | 1/2009 | Ning | C09D 5/24 361/527 |
| 2010/0097743 A1 | 4/2010 | Yoshida et al. | |
| 2010/0098841 A1 | 4/2010 | Yoshida et al. | |
| 2010/0165546 A1 | 7/2010 | Yoshida et al. | |
| 2013/0294013 A1 | 11/2013 | Ning | |

FOREIGN PATENT DOCUMENTS

| | | | |
|---|---|---|---|
| CN | 101302339 | 11/2008 | |
| CN | 101302340 | 11/2008 | |
| CN | 101303937 | 11/2008 | |
| DE | 102005016727 | 10/2006 | |
| EP | 1988128 | 11/2008 | |
| JP | 09-017686 | 1/1997 | |
| JP | 2005-179646 | 7/2005 | |
| JP | 2006-295184 | 10/2006 | |
| WO | WO 02/00759 | 1/2002 | |
| WO | WO 2007/005617 | 1/2007 | |
| WO | 2007097364 | 8/2007 | |
| WO | WO 2007091656 A1 * | 8/2007 | ............... C09D 5/24 |

OTHER PUBLICATIONS

Japanese Office Action dated Aug. 10, 2011 in corresponding Japanese Application No. 2010-508192 with English translation of enclosed wavy lined portion.

Chinese Office Action dated Jan. 13, 2012, with English Translation; Application No. 200980112914.4.

Heraeus data sheet for Clevious P. Dec. 17, 2010.

Ouyang, J., Chu, C., Chen, F., Xu, Q., and Yang, Y., "High-Conductivity Poly(3,4-Ethylenedioxythiopehene):Poly(styrene sulfonate) Film and its Application in Polymer Optoelectronic Devices", Adv. Funct. Mater, 2005, 15(2), 203-208.

Chinese Office Action dated Dec. 31, 2014 in corresponding Chinese Patent Application No. 201310153085.2 with English translation of Chinese Office Action.

* cited by examiner

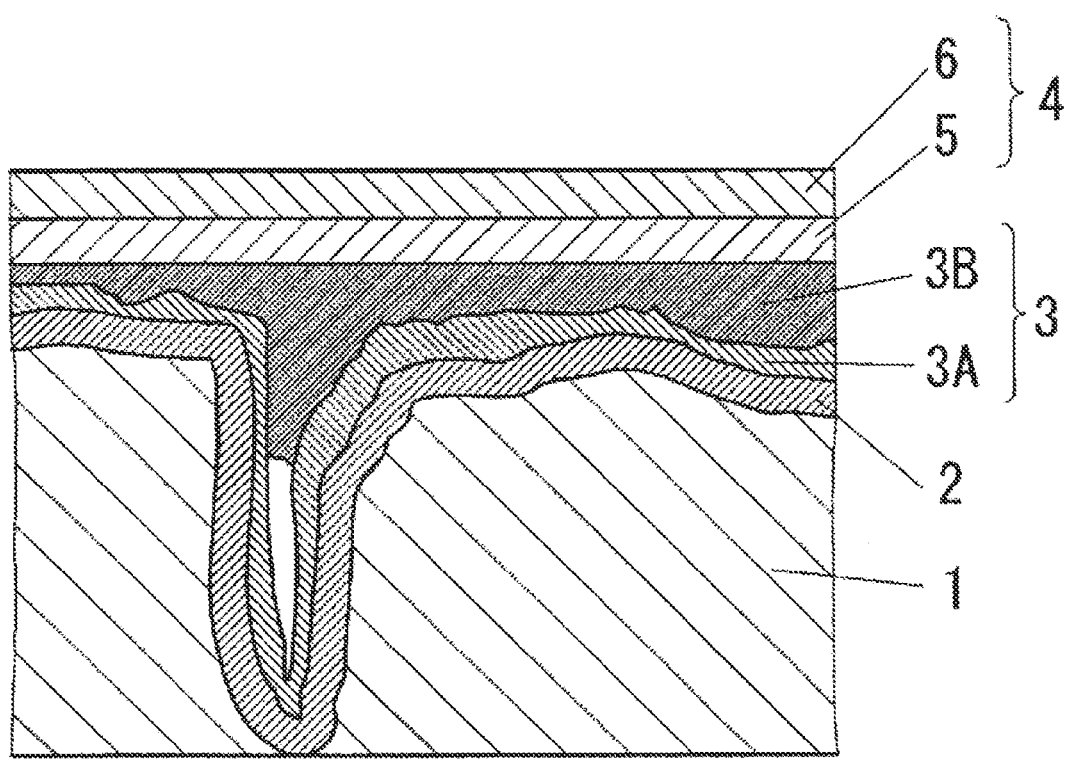

SOLID ELECTROLYTIC CAPACITOR

TECHNICAL FIELD

The present invention relates to an electrically conductive polymer suspension, an electrically conductive polymer composition, a solid electrolytic capacitor, and a method for producing the same, more particularly, to an electrically conductive polymer suspension having excellent dispersibility, an electrically conductive polymer composition having high electrical conductivity and excellent water-resistance, a solid electrolytic capacitor having low equivalent series resistance and excellent reliability, and a method for producing the same.

BACKGROUND ART

A solid electrolytic capacitor has been developed in which a porous body made of valve-action metal such as tantalum or aluminum is subjected to anodizing process so that a dielectric oxidation film is formed on the porous body and, then, a electrically conductive polymer layer is formed on the dielectric oxidation film, and the electrically conductive polymer layer is employed as the solid electrolyte of the capacitor.

A method of forming the electrically conductive polymer layer which serves as the solid electrolyte of the capacitor is mainly classified into chemical oxidation polymerization or electrolysis polymerization. The monomers of which the electrically conductive polymer material is composed are known to include pyrrole, thiophene, 3,4-ethylenedioxythiopene, and aniline.

Such solid electrolytic capacitors have lower ESR (Equivalent Series Resistance) than a conventional capacitor employing manganese dioxide as the solid electrolyte and, thus, begins to be utilized in various purposes. Recently, as integrated circuits tend to operate at high frequency and large current, a solid electrolytic capacitor has been in demand which has lower ESR and large capacitance and small loss.

As the technique related to such solid electrolytic capacitors, Patent document 1 discloses the improved process for producing the solid electrolytic capacitor with low ESR in which a high-density polymer outer layer with good covering of the edges can be simply achieved and reliably reproduced, comprising the steps of: applying a dispersion a) comprising particles b) of an electrically conductive polymer which comprises polyaniline and/or polythiophene onto a capacitor body which comprises a porous electrode body made of electrode material, a dielectric covering the surface of the electrode material, and a solid electrolyte comprising a electrically conductive material on the dielectric surface; and at least partly removing a dispersing agent d) and/or curing a binder c) in order to form an electrically conductive polymeric outer layer; wherein the particles b) of the electrically conductive polymer in the dispersion a) have an average diameter of 70 to 500 nm It is preferable that the dispersion a) further comprises a compound including an ether, lactone, amide or lactam group; a sulfone; a sulfoxide; a sugar; a sugar derivative; a sugar alcohol; a furan derivative; and/or a di- or poly-alcohol in order to increase the conductivity.

DOCUMENT(S) OF PRIOR ART

Patent Document

Patent Document 1: Japanese Patent Application Laid-Open No. 2006-295184.

SUMMARY OF THE INVENTION

Problem to be Solved by the Invention

However, in case that a sugar alcohol in which the number of OH group of sorbitol and mannitol are relatively rich are contained as the additive in the polymer solution, there occur their precipitations in the drying of a film-formation process. The resultant electrically conductive polymer film has low density, low conductivity, and bad state of surface smoothness (whether or not there are residual bubbles, whether or not there are precipitations). In the capacitor with the film in this state, there is large resistance at the interface between the film and a graphite layer or an inner polymeric layer, and there is a problem that ESR becomes higher. Further, because of the bad state of the surface smoothness, sealing performance is bad and, hence, ESR deterioration comes into being accelerated in long-term stability tests such as a moisture-resistance or a heat-resistance.

As mentioned above, although the solid electrolytic capacitor employing the electrically conductive polymer as the solid electrolyte has been studied in various aspects, current situation has still been that both of the low ESR and the good long-term stability are not yet sufficiently accomplished at the same time.

Purposes for the present invention is to provide an electrically conductive polymer composition having high electrical conductivity, excellent water-resistance, high density and excellent smoothness; to provide a solid electrolytic capacitor avoiding reduction of the conductivity and having low ESR and excellent reliability, and a method for producing the same, and further to provide a method of conveniently producing a solid electrolytic capacitor using substituted compound being easy to handle and being safe additive.

Means for Solving the Problem

An electrically conductive polymer suspension according to the present invention is characterized in that the suspension comprises an electrically conductive polymer material comprising dopant composed of a polyacid or a salt thereof and an electrically conductive polymer; at least one compound (A) selected from erythritol, xylitol and pentaerythritol; and a dispersion medium.

It is preferable that the electrically conductive polymer material comprises, as the dopant, a polysulfonic acid or a polycarboxylic acid. It is more preferable that the electrically conductive polymer material comprises, as the dopant, a polystyrene sulfonic acid or a polyester sulfonic acid. It is preferable that the electrically conductive polymer material comprises, as the electrically conductive polymer, a polymer obtained by polymerizing at least one monomer selected from a group consisted of pyrrole, thiophene, aniline and derivatives thereof.

An electrically conductive polymer composition according to the present invention is characterized in that the composition is obtained by removing the dispersion medium from the electrically conductive polymer suspension. It is preferable that removing the dispersion medium is carried out at the melting temperature of the compound (A) or higher.

A solid electrolytic capacitor according to the present invention is characterized in that the capacitor comprises a solid electrolyte layer comprising the electrically conductive polymer composition. It is preferable that the solid electrolytic capacitor further comprises an anode body made of a valve action metal; and a dielectric layer formed on the surface of the anode body, wherein the solid electrolyte layer is formed on the dielectric layer. It is preferable that the valve action metal is at least one selected from aluminum, tantalum or niobium.

A method for producing a solid electrolytic capacitor according to the present invention is characterized in that the method comprises forming a dielectric layer on a surface of an anode body made of a valve action metal; and forming a first electrically conductive polymer layer by application or impregnation of the electrically conductive polymer suspension onto the dielectric layer, and by removing the dispersion medium from the electrically conductive polymer suspension. It is preferable that the method further comprises, before forming the first electrically conductive polymer layer, forming a second electrically conductive polymer layer on the dielectric layer by a chemical oxidation polymerization or an electrolysis polymerization. It is preferable that in forming the first electrically conductive polymer layer, removing the dispersion medium is carried out at the melting temperature of the compound (A) or higher. It is preferable that temperature at which the dispersion medium is removed is equal to 150° C. or higher and lower than 270° C. It is preferable that an oxidation film covering the valve action metal is formed as the dielectric layer. It is preferable that the valve action metal is at least one selected from aluminum, tantalum or niobium.

Effect of the Invention

According to the present invention, in that at least one compound (A) selected from erythritol, xylitol and pentaerythritol is contained in the electrically conductive polymer layer, the electrically conductive polymer composition having high density, high electrical conductivity and good moisture-resistance can be obtained. Moreover, the solid electrolytic capacitor having low ESR and excellent reliability and the method for producing the same can be provided. Further, a method of conveniently producing the solid electrolytic capacitor using a material to be easy to handle can be provided.

BRIEF DESCRIPTION OF THE DRAWINGS

The FIGURE shows a schematic view illustrating an inner structure of a solid electrolytic capacitor according to the present invention.

MODE(S) FOR CARRYING OUT THE INVENTION

An electrically conductive polymer suspension according to the present invention is characterized in that the suspension comprises an electrically conductive polymer material comprising dopant composed of a polyacid or a salt thereof and an electrically conductive polymer; at least one compound (A) selected from erythritol, xylitol and pentaerythritol; and a dispersion medium.

A polyacid or salt thereof can be used as the dopant. Specific examples of polyacid may include, but is not limited to, polysulfonic acids such as polyvinyl sulfonic acids, polystyrene sulfonic acids and poly(2-acrylicamide-2-methylpropane sulfonic acid), and polycarboxylic acids such as polyacrylic acids, polymethacrylic acids and polymaleic acids. Among them, polystyrene sulfonic acids and polyester sulfonic acids are more preferable. The polyacid or salt thereof may be used alone or in combinations of two or more thereof. Weight-average molecular weight of the polyacid or salt thereof is not limited.

As an electrically conductive polymer, a polymer obtained by polymerizing at least one monomer selected from a group consisted of pyrrole, thiophene, aniline and derivatives thereof can be used. Derivatives of thiophene may include 3,4-ethylenedioxythiopene. As an electrically conductive polymer, 3,4-ethylenedioxythiopene is preferably used. The electrically conductive polymer may be used alone or in combinations of two or more thereof.

As a dispersion medium, it is preferable to choose a dispersion medium which has good compatibility with a monomer of which the electrically conductive polymer is composed, and any one of water, organic solvent and water-miscible organic solvent may be used. Specific examples of the organic solvent may include, but is not limited to, alcohol-based solvents such as methanol, ethanol and propanol; aromatic hydrocarbon-based solvents such as benzene, toluene and xylene; and aliphatic hydrocarbon-based solvents such as hexane. The organic solvent may be used alone or in combinations of two or more thereof. Among them, water is preferable.

The density of the electrically conductive polymer in the electrically conductive polymer suspension may preferably be in a range of 0.1 to 20 weight % and, more preferably be in a range of 0.5 to 10 weight %. In order to obtain the electrically conductive polymer with high conductivity, it is preferable to use 20 to 3000 weight of the dopant, more preferable to use 30 to 1000 weight of the dopant, in relation to 100 weight of the electrically conductive polymer.

The electrically conductive polymer suspension according to the present invention comprises at least one compound (A) selected from erythritol, xylitol and pentaerythritol. The compound (A) provides good dispersion ability for the electrically conductive polymer suspension and, hence, provides high density, high conductivity and good moisture-resistance for the electrically conductive polymer composition. In particular, pentaerythritol can exhibit the above-mentioned function even when the suspension contains small amount of pentaerythritol, and, hence, pentaerythritol is suitably used.

The dispersion ability in the electrically conductive polymer suspension before/after adding the compound (A) may be evaluated by a particle size distribution measurement method and, also, may be evaluated by a centrifugal sedimentation method, a light transmission method, a laser diffraction method, a dynamic light scattering method, or supersonic wave method as well.

It is preferable that the compound which is added into the electrically conductive polymer suspension is in form of solid powder. In addition, it is preferable that the compound can be dissolved into the dispersion medium of the electrically conductive polymer suspension and the melting temperature of the compound is equal to or higher than the boiling point of the dispersion medium. For example, in case that the suspension contains water as the dispersion medium, it is preferable that the compound to be added has a melting temperature equal to or higher than 100° C. Here, the melting temperature of the compound may be measured by TG/DTA (differential thermal analysis) or DSC (differential scanning calorimetric analysis).

The content of the compound (A) is not limited and only mixing the compound (A) may be effective. Mixing the compound (A) with molar amount equal to or more than that of polyacid component is preferable because particle dispersion ability in the electrically conductive polymer suspension becomes excellent and, hence, the electrically conductive polymer composition with high density or high conductivity may be obtained. An upper limit of the content of the compound (A) is not limited as long as the compound (A) is able to be dissolved into the electrically conductive polymer suspension.

Erythritol is preferable in that crystallinity of erythritol is higher than, for example, that of polyhydric alcohol such as sorbitol and maltose and, hence, erythritol has good moisture-resistance and is easy to handle.

Erythritol and xylitol are also preferable in that they are known to be additives for food, e.g. a sweetener, and, hence, they have excellent safety and stability and impose low load onto the environment. Moreover, they are desirable in that their solubility levels into water are several times larger than those of non-aqueous solvents such as ethylene glycol and glycerin and, hence, freedom degrees to design added amounts thereof are higher than those of the non-aqueous solvents.

Pentaerythritol is characterized in that when it is heated, it sublimates slowly, and in that by heating it at a temperature equal to or higher than the melting point, it comes into be dehydrated and polymerized. By this, quality of the polymer film changes and film density and strength may improve, thereby the polymer film with excellent reliability may be obtained. Such reaction characteristics result from its chemical structure, and it is hard for such reaction characteristics to occur, for example, with chemical structures of erythritol and sorbitol.

The electrically conductive polymer composition according to the present invention is characterized in that it is obtained by removing the dispersion medium from the above-mentioned electrically conductive polymer suspension. The temperature, at which the dispersion medium is removed, is not limited as long as the temperature is equal to or more than a boiling point thereof, but it is preferable that the temperature is equal to or more than a melting temperature of the compound (A) because the resultant electrically conductive polymer composition has high density and high moisture-resistance. It is understood that this effect results from generation of ester as mentioned above.

To be specific, the temperature, at which the dispersion medium is removed, is preferably equal to or higher than 150° C. and more preferably equal to 180° C. or higher than 180° C. and less than 270° C. The drying time needs to be appropriately optimized according to drying temperature but, is not limited as long as deterioration of the electrically conductive polymer due to heating for the duration does not occur.

The present invention is directed to a solid electrolytic capacitor comprising a solid electrolyte layer comprising the above-mentioned electrically conductive polymer composition. Specifically, the solid electrolytic capacitor further comprises an anode body made of a valve action metal, and a dielectric layer formed on the surface of the anode body, wherein the solid electrolyte layer is formed on the dielectric layer.

The solid electrolytic capacitor according to the present invention can be produced by forming a dielectric layer on a surface of an anode body made of the valve action metal; and forming a first electrically conductive polymer layer by application or impregnation of the above-mentioned electrically conductive polymer suspension onto the dielectric layer, and by removing the dispersion medium from the electrically conductive polymer suspension.

In the following, configuration of the solid electrolytic capacitor according to the present invention and method for producing the same will be explained. The FIGURE shows a schematic view illustrating an inner structure of a solid electrolytic capacitor according to the present invention.

In the solid electrolytic capacitor (also called as capacitor element) of the FIGURE, dielectric layer 2, solid electrolyte layer 3 and cathode layer 4 in this order are formed on anode body 1.

Anode body 1 is made of a plate, a foil or a line of the valve action metal; a sintered body made of valve-action metal particles; or a porous body of metal which has been subjected to a surface-enlargement treatment by etching. Specific examples of the valve action metal may include, but is not limited to, tantalum, aluminum, titanium, niobium, zirconium or alloys thereof, and it is preferable that the valve action metal is at least one selected from tantalum, aluminum or niobium.

Dielectric layer 2 is, for example, an oxidation film obtained by electrolysis oxidizing of the surface of anode body 1, and is also formed in porous portions of the sintered body or the porous body. The thickness of the oxidation film can be appropriately adjusted based on the voltage in the electrolysis oxidizing.

Solid electrolyte layer 3 may include at least an electrically conductive polymer layer but, in the present invention, may include at least first electrically conductive polymer layer 3B containing the above-mentioned electrically conductive polymer composition. The electrically conductive polymer layer may include the polymer obtained by polymerizing at least one monomer selected from a group consisted of pyrrole, thiophene, aniline and derivatives thereof. In particular, pyrrole, thiophene, or derivatives thereof is preferably used, and pyrrole, thiophene or 3,4-ethylenedioxythiopene is more preferably used.

Solid electrolyte layer 3 may include an oxide derivative such as manganese dioxide or ruthenium oxide; or an organic semiconductor such as TCNQ (7,7,8,8-tetracyanoquionodimethane complex salt).

The first electrically conductive polymer layer 3B is formed by, after forming dielectric layer 2 on the surface of anode body 1 made of the valve action metal, application or impregnation of the above-mentioned electrically conductive polymer suspension onto the dielectric layer, and by removing the dispersion medium from the electrically conductive polymer suspension. Moreover, before forming the first electrically conductive polymer layer 3B, second electrically conductive polymer layer 3A may be formed on dielectric layer 2 by a chemical oxidation polymerization or an electrolysis polymerization. The monomer which is used in forming the second electrically conductive polymer layer 3A may be the same as that used in forming the above-mentioned electrically conductive polymer suspension. A metal salt or a sulfate may be used as an oxidizing agent.

As the method for applying the electrically conductive polymer suspension onto the dielectric layer, it is preferable that the applied suspension is left for several minutes to several of ten minutes after the application so that the suspension can be sufficiently filled into the porous portions of the porous body. As the method for impregnating the dielectric layer with the suspension, it is preferable that immersing the dielectric layer into the suspension is repeated. A pressurizing method or a depressurizing method is also preferable.

The temperature at which the dispersion medium is removed is not limited as long as the dispersion medium can be removed at the temperature, but the removal is preferably carried out at the temperature equal to or more than the melting temperature of the compound (A), more preferably carried out at the temperature lower than 270° C. in order to avoid the deterioration of the element due to the heat.

It is preferable that the first electrically conductive polymer layer 3B and the second electrically conductive polymer layer 3A closely formed on the surface of dielectric layer 2 have the same back-bone structure as that of the electrically conductive polymer.

The dopant used in forming the second electrically conductive polymer layer 3A may preferably be a sulfonic acid based-compound such as naphthalene sulfonic acid, benzene sulfonic acid, phenol sulfonic acid, styrene sulfonic acid, camphor sulfonic acid or a derivative thereof. Further, with regard to the molecular weight of the dopant, the dopant is appropriately selected from low molecular weight compounds to high molecular weight compounds.

Cathode layer 4 is not limited as long as it is electrically conductive, and may have two layered structure including graphite layer 5 made of graphite and silver/electrically conductive resin layer 6.

(Operation)

By mixing at least one compound (A) selected from erythritol, xylitol and pentaerythritol into the electrically conductive polymer suspension comprising the dopant composed of polyacid or salt thereof, excessive dopants (resistance components), which exist on outer surfaces of the electrically conductive polymer particles dispersed in the suspension and which do not function as the dopant, are isolated, and thereby the resistances between the electrically conductive polymer particles may decrease and density of the electrically conductive polymer may increase. Therefore, the polymer film with high density can be obtained and, as a result, high conductivity is accomplished. Further, there are not bubbles in the electrically conductive polymer film and, therefore, the film has a smooth surface. Additionally, the electrically conductive polymer film with good moisture-resistance can be produced.

Specifically, since the compound (A) has a hydroxyl group at the terminal end, the compound functions so as to dissociate, for example, a sulfonic acid compound as the above-mentioned dopant into ion pairs, and, consequently, the conductivity of the electrically conductive polymer film may increase, and the dispersion ability of the particles in the suspension may improve with the electric charge repulsions between the particle surfaces by the ion pairs.

In addition, it is thought that by removing the dispersion medium, there occurs dehydration condensation between sulfonic acid group or carboxylic acid group derived from polyacid and the hydroxyl group and, hence, the ester is generated, so that the sulfonic acid or the carboxylic acid reduces, thereby changing hydrophilic property to hydrophobic property.

By these operations, in the solid electrolytic capacitor according to the present invention, the first electrically conductive polymer layer with high density is formed and, at the same time, it penetrates into more internal regions of the porous body being the anode body, so that the contact region between the dielectric layer or the second electrically conductive polymer layer and the first electrically conductive polymer layer in the external region (surface region) may increase, and adhesion ability of the first electrically conductive polymer layer in the inner porous portion/the external portion may improve due to anchoring effect, whereby realizing an electrically conductive path sufficiently.

Additionally, since it has the electrically conductive polymer film with high density and low moisture adsorption, interfacial peeling due to thermal stress or moisture adsorption is prevented.

Accordingly, since interfacial peeling due to thermal stress or moisture adsorption is prevented without decreasing the conductivity of the electrically conductive polymer layer, the capacitor with low ESR and improved reliability is realized.

(Comparison with Prior Art)

When comparing the present invention with the technology disclosed in Patent document 1, configurations of the electrically conductive polymer layers are different between them. Specifically, Patent document 1 exemplifies many kinds of materials as one for increasing the conductivity and uses among them only dimethyl sulfoxide in Examples. However, dimethyl sulfoxide is completely different from erythritol, xylitol or pentaerythritol used in the present invention in a back-bone structure and material characteristics. Moreover, Patent document 1 never explicitly discloses the operation that these compounds increase the conductivity.

Any one of erythritol, xylitol and pentaerythritol used in the present invention is not disclosed in Patent document 1. Among them, pentaerythritol is the material which is realized by focusing the reactivity of polycondensation from the characteristic of the chemical structure.

That is, it is apparent that Patent document 1 adds the material into the suspension with the focus and intended operation which are different from those in the present invention in which the material containing the hydroxyl group is used. Therefore, it is obvious that Patent document 1 never teaches the present invention and that the present invention can not be easily realized.

EXAMPLES

Now, the present invention will be described in details with reference to Examples, but the present invention is not limited to the Examples.

In addition, erythritol, xylitol and pentaerythritol used in the examples are commercially available.

Example 1

Example 1 will be explained referring to the FIGURE. A porous body aluminum foil which has 3×4 mm size and which has been subjected to a surface enlargement treatment by etching was used as anode body 1, and, then, an oxidation film as dielectric layer 2 was formed on the surface of the foil using an electrolysis oxidizing method. After that, the resultant structure was repeatedly immersed into a bath containing a monomer solution and a bath containing a dopant and an oxidizing agent solution. Subsequently, second electrically conductive polymer layer 3A made of poly(3,4-ethylenedioxythiopene) was formed in internal porous portions of the porous body by a chemical polymerization method.

Thereafter, 1 g of 3,4-ethylenedioxythiopene was poured into a mixture solution of 100 g of pure water and 2 g of polystyrene sulfonic acid (M.w.: 50,000) and the resultant mixture was stirred at normal temperature for five minutes.

Next, 40 wt % persulfuric acid ammonium water solution was poured by 1 ml/min so that the total poured amount thereof comes to 5 g, and, then, the resultant mixture was stirred (with 1,000 rpm) for 50 hours at normal temperature so that oxidation polymerization thereof occurred. In this way, obtained was a polymer suspension containing approximately 3 wt % of the electrically conductive polymer material component composed of poly(3,4-ethylenedioxythiopene) and polystyrene sulfonic acid. At this time, the color of the suspension changed as follows: light yellow-→light gray→gray→dark green→light deep blue→dark deep blue. After collecting 10 g of the suspension with dark deep blue, 0.5 g of erythritol was mixed thereto, and, then, the mixture was stirred for 30 minutes to be dissolved, and, as a result, the electrically conductive polymer suspension was obtained.

The particle size distribution of the electrically conductive polymer suspension was measured using a laser diffraction method. As the result of the measurement, D50 value was 0.92 Here, D50 was a particle diameter when the accumulation mass became 50% in an accumulation particle size curve.

5 µl of this electrically conductive polymer suspension was dropped onto second electrically conductive polymer layer 3A and was left for 10 minutes at normal temperature. Next, preliminary drying was performed for 10 minutes at 120° C. and, subsequently, main drying was performed for 30 minutes at 180° C., thereby forming first electrically conductive polymer layer 3B.

Visual appearance of the first electrically conductive polymer layer 3B was checked by human eyes and film density thereof also was measured. In checking the visual appearance of the first electrically conductive polymer layer 3B, precipitations were not visible after the preliminary drying, and the film was smooth after the main drying. The film density of the first electrically conductive polymer layer 3B was 0.5 µm/ml·cm$^2$.

Regarding calculating the film density, a thickness of the film obtained after dropping 5 µl of the suspension onto the aluminum porous body foil which has 3×4mm size and after performing the main drying was measured, and the measured film thickness was converted into the film thickness per 1 ml and 1 cm$^2$.

Further, graphite layer 5 was formed on first electrically conductive polymer layer 3B and silver/electrically conductive resin layer 6 was formed on layer 5, so that the capacitor device was fabricated. After measuring initial ESR of the capacitor device at 100 kHz, ESR change ratio (times) (=(ESR after test, 100 kHz)/(initial ESR, 100 kHz)) was calculated as a heat-resistance property and a moisture-resistance property. Here, the condition for the heat-resistance test was that the device was left with no load under the atmosphere at 125° C. for 500 hours, while the condition for the moisture-resistance test was that the device was left with no load under 95% R.H. atmosphere at 65° C. for 500 hours.

The number of the capacitors to be tested is 10 in each case and the average values of measurement results are shown in Table 1.

As shown in Table 1, the initial ESR of the capacitor device at 100 kHz was 5.2 mΩ while the ESR change ratio after the heat-resistance test was 1.5 times and the ESR change ratio after the moisture-resistance test was 1.4 times.

Example 2

Example 2 was carried out in the same way as in Example 1 except that the electrically conductive polymer suspension was made with mixing 0.03 g of erythritol. The results thereof are shown in Table 1.

As shown in Table 1, the D50 value in the particle size distribution of the electrically conductive polymer suspension was 1.31 µm. In checking the visual appearance of the first electrically conductive polymer layer 3B, precipitations were not visible after the preliminary drying, and the film was smooth after the main drying. The film density of the first electrically conductive polymer layer 3B was 0.53 µm/ml·cm$^2$. The initial ESR of the capacitor device at 100 kHz was 5.6 mΩ while the ESR change ratio after the heat-resistance test was 1.6 times and the ESR change ratio after the moisture-resistance test was 1.5 times.

Example 3

Example 3 was carried out in the same way as in Example 1 except that the electrically conductive polymer suspension was made with mixing 2 g of erythritol. The results thereof are shown in Table 1.

As shown in Table 1, the D50 value in the particle size distribution of the electrically conductive polymer suspension was 1.89 µm. In checking the visual appearance of the first electrically conductive polymer layer 3B, precipitations were not visible after the preliminary drying, and the film was smooth after the main drying. The film density of the first electrically conductive polymer layer 3B was 0.51 µm/ml·cm$^2$. The initial ESR of the capacitor device at 100 kHz was 5.5 mΩ while the ESR change ratio after the heat-resistance test was 1.5 times and the ESR change ratio after the moisture-resistance test was 1.4 times.

Example 4

Example 4 was carried out in the same way as in Example 1 except that the electrically conductive polymer suspension was made with mixing 0.5 g of xylitol instead of 0.5 g of erythritol. The results thereof are shown in Table 1.

As shown in Table 1, the D50 value in the particle size distribution of the electrically conductive polymer suspension was 0.79 µm. In checking the visual appearance of the first electrically conductive polymer layer 3B, precipitations were not visible after the preliminary drying, and the film was smooth after the main drying. The film density of the first electrically conductive polymer layer 3B was 0.51 µm/m·cm$^2$. The initial ESR of the capacitor device at 100 kHz was 4.8 mΩ while the ESR change ratio after the heat-resistance test was 1.4 times and the ESR change ratio after the moisture-resistance test was 1.4 times.

Example 5

Example 5 was carried out in the same way as in Example 1 except that the electrically conductive polymer suspension was made with mixing 0.03 g of xylitol instead of 0.5 g of erythritol. The results thereof are shown in Table 1.

As shown in Table 1, the D50 value in the particle size distribution of the electrically conductive polymer suspension was 0.89 µm. In checking the visual appearance of the first electrically conductive polymer layer 3B, precipitations were not visible after the preliminary drying, and the film was smooth after the main drying. The film density of the first electrically conductive polymer layer 3B was 0.56 µm/ml·cm$^2$. The initial ESR of the capacitor device at 100 kHz was 5.2 mΩ while the ESR change ratio after the heat-resistance test was 1.5 times and the ESR change ratio after the moisture-resistance test was 1.5 times.

Example 6

Example 6 was carried out in the same way as in Example 1 except that the electrically conductive polymer suspension was made with mixing 0.5 g of pentaerythritol instead of 0.5 g of erythritol. The results thereof are shown in Table 1.

As shown in Table 1, the D50 value in the particle size distribution of the electrically conductive polymer suspension was 0.90 In checking the visual appearance of the first electrically conductive polymer layer 3B, the film was smooth after the main drying. The film density of the first electrically conductive polymer layer 3B was 0.48 μm/ml·cm$^2$.

In forming first electrically conductive polymer layer 3B, the appearance of first electrically conductive polymer layer 3B was checked by the human eyes when drying temperature changes. To be specific, after dropping 0.5 μl of the prepared electrically conductive polymer suspension onto second electrically conductive polymer layer 3A, 1) it had been left at normal temperature for 10 minutes; 2) it had been dried at 120° C. for 10 minutes; 3) it had been dried at 150° C. for 30 minutes; and 4) it had been dried at 180° C. for 30 minutes, and, then, the checkings were respectively carried out. As the results, at the conditions 1) and 2), white precipitations remained on the surface of first electrically conductive polymer layer 3B. At the condition 3), approximately 90% of the precipitations disappeared. At the condition 4), all of the precipitations disappeared. From this, it was appreciated that precipitations of pentaerythritol appeared in first electrically conductive polymer layer 3B at the preliminary drying condition 2) but all of the precipitations of pentaerythritol disappeared in view of the human eyes after the main drying at 180° C. Further, it was confirmed that as the drying temperature increased, dehydration polymerization reaction was ongoing.

The initial ESR of the capacitor device at 100 kHz was 5.1 mΩ while the ESR change ratio after the heat-resistance test was 1.3 times and the ESR change ratio after the moisture-resistance test was 1.3 times.

Example 7

Example 7 was carried out in the same way as in Example 16 except that the main drying was performed at 225° C. for 5 minutes. The results thereof are shown in Table 1.

As shown in Table 1, in checking the visual appearance of the first electrically conductive polymer layer 3B, precipitations were not visible after the main drying, and the film was smooth. The film density of the first electrically conductive polymer layer 3B was 0.45 μm/ml·cm$^2$. The initial ESR of the capacitor device at 100 kHz was 4.7 mΩ while the ESR change ratio after the heat-resistance test was 1.3 times and the ESR change ratio after the moisture-resistance test was 1.2 times.

Example 8

Example 8 was carried out in the same way as in Example 6 except that the main drying was performed at 265° C. for 1 minute. The results thereof are shown in Table 1.

As shown in Table 1, in checking the visual appearance of the first electrically conductive polymer layer 3B, precipitations were not visible after the main drying, and the film was smooth. The film density of the first electrically conductive polymer layer 3B was 0.44 μm/ml·cm$^2$. The initial ESR of the capacitor device at 100 kHz was 4.8 mΩ while the ESR change ratio after the heat-resistance test was 1.2 times and the ESR change ratio after the moisture-resistance test was 1.2 times.

Example 9

Example 9 was carried out in the same way as in Example 1 except that a tantalum porous body was employed as the anode body 1. The results thereof are shown in Table 1.

As shown in Table 1, in checking the visual appearance of the first electrically conductive polymer layer 3B, precipitations were not visible after the preliminary drying, and the film was smooth after the main drying. The film density of the first electrically conductive polymer layer 3B was 0.51 μm/ml·cm$^2$. The initial ESR of the capacitor device at 100 kHz was 6.7 mΩ while the ESR change ratio after the heat-resistance test was 1.6 times and the ESR change ratio after the moisture-resistance test was 1.4 times.

Comparative Example 1

An porous body aluminum foil which has 3×4 mm size and which has been subjected to a surface enlargement treatment by etching was used as anode body 1, and, then, an oxidation film as dielectric layer 2 was formed on the surface of the foil using an electrolysis oxidizing method. After that, the resultant structure was repeatedly immersed into a bath containing a monomer solution and a bath containing a dopant and oxidizing agent solution. Subsequently, second electrically conductive polymer layer 3A made of poly(3,4-ethylenedioxythiopene) was formed in internal porous portions of the porous body by a chemical polymerization method.

Thereafter, 1 g of 3,4-ethylenedioxythiopene was poured into a mixture solution of 100 g of pure water and 2 g of polystyrene sulfonic acid (M.w.: 50,000) and the resultant mixture was stirred at normal temperature for five minutes. Next, 40 wt % persulfuric acid ammonium water solution was poured by 1 ml/min so that total poured amount thereof comes to 5 g, and, then, the resultant mixture was stirred (with 1,000 rpm) for 50 hours at normal temperature so that oxidation polymerization thereof occurred. In this way, obtained was a polymer suspension containing approximately 3 wt % of the electrically conductive polymer material component composed of poly(3,4-ethylenedioxythiopene) and polystyrene sulfonic acid.

5 μl of this electrically conductive polymer suspension was dropped onto second electrically conductive polymer layer 3A and was left for 10 minutes at normal temperature. Next, preliminary drying was performed for 10 minutes at 120° C. and, subsequently, main drying was performed for 30 minutes at 180° C., thereby forming first electrically conductive polymer layer 3B. Further, graphite layer 5 was formed on first electrically conductive polymer layer 3B and silver/electrically conductive resin layer 6 was formed on layer 5, so that the capacitor device was fabricated. The results thereof are shown in Table 1.

As shown in Table 1, the D50 value in the particle size distribution of the electrically conductive polymer suspension was 2.3 μm. In checking the visual appearance of the first electrically conductive polymer layer 3B, relatively many bubbles appeared after the main drying and the film was smooth. The film density of the first electrically conductive polymer layer 3B was 0.76 μm/ml·cm$^2$. The initial ESR of the capacitor device at 100 kHz was 10.1 mΩ while the ESR change ratio after the heat-resistance test was 3.1 times and the ESR change ratio after the moisture-resistance test was 3.4 times.

Comparative Example 2

After collecting 10 g of the suspension obtained in Comparative Example 1, thereto was mixed 0.5 g of ethylene glycol, and, then, the resultant mixture was stirred for 30 minutes to be dissolved, and, as a result, the electrically conductive polymer suspension was obtained.

5 µl of this electrically conductive polymer suspension was dropped onto second electrically conductive polymer layer 3A and was left for 10 minutes at normal temperature. Next, preliminary drying was performed for 10 minutes at 120° C. and, subsequently, main drying was performed for 30 minutes at 180° C., thereby forming first electrically conductive polymer layer 3B. Further, graphite layer 5 was formed on first electrically conductive polymer layer 3B and silver/electrically conductive resin layer 6 was formed on layer 5, so that the capacitor device was fabricated. The results thereof are shown in Table 1.

As shown in Table 1, the D50 value in the particle size distribution of the electrically conductive polymer suspension was 2.15 µm. In checking the visual appearance of the first electrically conductive polymer layer 3B, the film was smooth after the main drying. The film density of the first electrically conductive polymer layer 3B was 0.61 µm/ml·cm². The initial ESR of the capacitor device at 100 kHz was 8.1 mΩ while the ESR change ratio after the heat-resistance test was 1.7 times and the ESR change ratio after the moisture-resistance test was 1.8 times.

Comparative Example 3

Comparative Example 3 was carried out in the same way as in Comparative Example 2 except that the electrically conductive polymer suspension was made with mixing 0.5 g of glycerin instead of 0.5 g of ethylene glycol. The results thereof are shown in Table 1.

As shown in Table 1, the D50 value in the particle size distribution of the electrically conductive polymer suspension was 0.99 µm. In checking the visual appearance of the first electrically conductive polymer layer 3B, the film was smooth after the main drying. The film density of the first electrically conductive polymer layer 3B was 0.59 µm/ml·cm². The initial ESR of the capacitor device at 100 kHz was 7.1 mΩ while the ESR change ratio after the heat-resistance test was 1.8 times and the ESR change ratio after the moisture-resistance test was 1.7 times.

Comparative Example 4

Comparative Example 4 was carried out in the same way as in the second example except that in this example, the electrically conductive polymer suspension was made with mixing 0.5 g of sorbitol instead of 0.5 g of ethylene glycol. The results thereof are shown in Table 1.

As shown in Table 1, the D50 value in the particle size distribution of the electrically conductive polymer suspension was 1.73 µm. In checking the visual appearance of the first electrically conductive polymer layer 3B, precipitations were not visible after the main drying, but a few bubbles were visible, and the film was lack in the smoothness. The film density of the first electrically conductive polymer layer 3B was 0.67 µm/ml·cm². The initial ESR of the capacitor device at 100 kHz was 6.9 mΩ while the ESR change ratio after the heat-resistance test was 2.1 times and the ESR change ratio after the moisture-resistance test was 2.7 times.

Comparative Example 5

Comparative Example 5 was carried out in the same way as in the second example except that the electrically conductive polymer suspension was made with mixing 0.5 g of mannitol instead of 0.5 g of ethylene glycol and that particle size distribution measurement was performed and the visual appearance of first electrically conductive polymer layer 3B was checked by the human eyes. The results thereof are shown in Table 1.

As shown in Table 1, the D50 value in the particle size distribution of the electrically conductive polymer suspension was 1.91 µm. In checking the visual appearance of the first electrically conductive polymer layer 3B, a lot of precipitations were visible after the main drying, and the film was lack in the smoothness. Further, it was impossible to measure the film density of the first electrically conductive polymer and fabrication of the capacitor device was given up.

TABLE 1

| | mixture | | particle size distribution (µm, D50) | main drying temp. (° C.) | film appearance | film density (µm/ml · cm²) | initial ESR (mΩ, 100 kHz) | ESR change after heat-resistance test (times) | ESR change after water-resistance test (times) |
|---|---|---|---|---|---|---|---|---|---|
| | kind | mixed amount (g) | | | | | | | |
| Ex. 1 | erythritol | 0.5 | 0.92 | 180 | good | 0.50 | 5.2 | 1.5 | 1.4 |
| Ex. 2 | | 0.03 | 1.31 | 180 | good | 0.53 | 5.6 | 1.6 | 1.5 |
| Ex. 3 | | 2.0 | 1.89 | 180 | good | 0.51 | 5.5 | 1.5 | 1.4 |
| Ex. 4 | xylitol | 0.5 | 0.79 | 180 | good | 0.51 | 4.8 | 1.4 | 1.4 |
| Ex. 5 | | 0.03 | 0.89 | 180 | good | 0.56 | 5.2 | 1.5 | 1.5 |
| Ex. 6 | penta- erythritol | 0.5 | 0.90 | 180 | good | 0.48 | 5.1 | 1.3 | 1.3 |
| Ex. 7 | | | | 225 | good | 0.45 | 4.7 | 1.3 | 1.2 |
| Ex. 8 | | | | 265 | good | 0.44 | 4.8 | 1.2 | 1.2 |
| Ex. 9 | erythritol | 0.5 | 0.92 | 180 | good | 0.51 | 6.7 | 1.6 | 1.4 |
| Comp. Ex. 1 | | | 2.30 | 180 | bubbles appeared | 0.76 | 10.1 | 3.1 | 3.4 |
| Comp. Ex. 2 | ethylene- glycol | 0.5 | 2.15 | 180 | good | 0.61 | 8.1 | 1.7 | 1.8 |
| Comp. Ex. 3 | glycerin | 0.5 | 1.99 | 180 | good | 0.59 | 7.1 | 1.8 | 1.7 |
| Comp. Ex. 4 | sorbitol | 0.5 | 1.73 | 180 | a few bubbles appeared | 0.67 | 6.9 | 2.1 | 2.7 |

TABLE 1-continued

| | mixture | | particle | main | | | ESR change | ESR change |
|---|---|---|---|---|---|---|---|---|
| | kind | mixed amount (g) | size distribution (μm, D50) | drying temp. (° C.) | film appearance | film density (μm/ml · cm$^2$) | initial ESR (mΩ, 100 kHz) | after heat-resistance test (times) | after water-resistance test (times) |
| Comp. Ex. 5 | mannitol | 0.5 | 1.91 | 180 | a lot of precipitations | cannot measured | — | — | — |

From Examples 1 to 9 that by mixing at least one compound (A) selected from erythritol, xylitol and pentaerythritol into the electrically conductive polymer suspension, the particles in the electrically conductive polymer suspension become finer and, hence, the dispersion ability of the suspension improves. It was found from the results that the first electrically conductive polymer layer 3B formed by the method had high density, that the capacitor device had reduction of the initial ESR, and that ESR risings were drastically suppressed at the heat-resistance test and moisture-resistance test.

On the other hand, such effects were not accomplished in Comparative Example 1 in which none was added into the suspension. Further, the drastic suppression of the ESR risings as in the present invention did not appear in Comparative Examples 2 to 5. In particular, in Comparative Example 4 in which sorbitol was added, the ESR risings were not considerably suppressed, and in Comparative Example 5 in which mannitol was added, it was hard to form the electrically conductive polymer layer.

It was found from the results of Examples 1 to 3 that even if the amount of the compound (A) mixed into the suspension was small, mixing the compound (A) was sufficiently effective. This implies that the amount of the compound (A) may further reduce. It is found from the result of Example 6 that when pentaerythritol is added, the film with high density is obtained, so that the initial the ESR of the capacitor device is low and, the ESR risings at the heat-resistance test and moisture-resistance test are considerably suppressed.

It was found from the results of Examples 6 to 8 that by increasing the temperature in the main drying, the film has further high density, and, hence, the initial ESR of the capacitor device was low and, the ESR risings at the heat-resistance test and moisture-resistance test were considerably suppressed. Such effects may mainly result from the dehydration polymerization reaction in the polymer film.

It was found from the above results that by mixing at least one compound (A) selected from erythritol, xylitol and pentaerythritol into the electrically conductive polymer suspension, the electrically conductive polymer suspension with good dispersion ability can be provided. Further, It was found that the electrically conductive polymer film with high density and excellent smoothness can be formed using the electrically conductive polymer suspension and that the constituents of the present inventions are suitable to produce the solid electrolytic capacitor with low ESR and with good heat-resistance and water-resistance properties

Example 10

The electrically conductive polymer films were respectively formed on a glass substrate using the electrically conductive polymer suspensions made in Examples 1, 4, 6 and 8 and in Comparative Example 1. The temperatures at which the dispersion mediums were removed were respectively set to the same conditions (formation of first electrically conductive polymer layer 3B) as those in the corresponding Examples.

Visual appearances (colors and transparencies) of the obtained electrically conductive polymer films were checked. Subsequently, the electrically conductive polymer films were immersed into pure water for 1 hour, and, then, the water-resistance properties (swelling of the electrically conductive polymer film and peeling-off of the film from the glass substrate) thereof were evaluated. The results are shown in Table 2.

TABLE 2

| electrically conductive polymer film | Visual appearance | water-resistance property |
|---|---|---|
| Ex. 1 | Dark deep blue transparent | no swelling no peeling-off |
| Ex. 4 | black transparent | no swelling no peeling-off |
| Ex. 6 | dark blue non-transparent | no swelling (water repellency) no peeling-off |
| Ex. 8 | Dark deep blue non-transparent | no swelling (water repellency) no peeling-off |
| Comp. Ex. 1 | dark blue transparent | swelling, peeling-off |

Subsequently, FTIR (Fourier transform infrared spectroscopy) was executed onto the electrically conductive polymer film (Table 2, Example 1). From the result, it was found that a peak of hydroxyl group derived from erythritol disappears and a new spectrum which looks like that of ester appears. Thus, it was known that the organic structure changed.

Example 11

Polystyrene sulfonic acid aqueous solution (20 wt %, M.w.: 50,000) which was commercially available was diluted into 1 wt % thereof by pure water. Thereafter, 10 g of the 1 wt % polystyrene sulfonic acid aqueous solution was collected, and 1 g of erythritol was mixed thereto, and, then, the mixture was stirred at normal temperature for 30 minutes to be dissolved. The solution was dropped onto the glass substrate and was left at normal temperature.

Thereafter, TG/DTA (differential thermal analysis) was executed onto erythritol. Condition for this analysis was that the temperature was incremented by 10° C./min under air. As the result, a melting peak appeared at near 120° C. Next, the temperature of the composition on the glass substrate was incremented step-by-step within a constant-temperature tank, and, the visual appearance thereof was checked. As the result, the visual appearance of the composition became transparent at near 125° C., and the color turned into light brown near 150° C., and turned into dark brown at near 180° C.

At the same time, the visual appearance of the composition which did not contain erythritol but which contained only polystyrene sulfonic acid was checked. As the result, the visual appearance of the composition does not substantially change though the temperature increases to 180° C. and the color was light yellow.

Example 12

Example 12 was carried out in the same way as in Example 11 except that 0.3 g of pentaerythritol was mixed instead of 1 g of erythritol.

Thereafter, TG/DTA (differential thermal analysis) was executed onto pentaerythritol. As the result, a melting peak appeared at near 193° C. Next, temperature of the composition on the glass substrate was incremented step-by-step within a constant-temperature tank, and, the visual appearance thereof was checked. As the result, the visual appearance of the composition did not change near at 150° C., and the color turned into light brown at near 180° C., turned into dark brown at near 225° C., and turned into slightly blackish dark brown at near 265° C.

Example 13

Example 13 was carried out in the same way as in Example 11 except that a water-soluble polyester sulfonic acid resin (25wt %, M.w.: 28,000) which was commercially available was used instead of the polystyrene sulfonic acid aqueous solution (20 wt %, M.w.: 50,000). As the result, the visual appearance of the composition has, at near the same temperature, similar changed state.

Example 14

Example 14 was carried out in the same way as in Example 11 except that a polyacrylic acid (45 wt %, M.w.: 10,000) which was commercially available was used instead of the polystyrene sulfonic acid aqueous solution (20 wt %, M.w.: 50,000). As the results, the visual appearance of the composition has, at near the same temperature, similar changed state.

Example 15

10 g of the electrically conductive polymer solution (amount of solid component: approximately 3.5 wt %) composed of poly(3,4-ethylenedioxythiopene) and polystyrene sulfonic acid which are commercially available was collected, and 1 g of erythritol was mixed thereto, and, then, the mixture was stirred for 30 minutes to be dissolved.

Thereafter, the dissolved solution was dropped onto a glass substrate and was dried for 30 minutes at 180° C. to form a electrically conductive polymer film. The visual appearance thereof changes from dart blue to dark deep blue. Subsequently, water-resistance properties were evaluated in the same way as in Example 10. As the results, there was small swelling of the electrically conductive polymer film, but peeling off from the glass substrate thereof does not occur. Subsequently, FTIR (Fourier transform infrared spectroscopy) was executed onto the electrically conductive polymer film. From the result, it was found that a peak of hydroxyl group derived from erythritol disappeared and a new spectrum which looks like that of ester appeared. Thus, it was known that the organic structure changed.

Example 16

Example 16 was carried out in the same way as in Example 15 except that 1 g of xylitol was mixed instead of 1 g of erythritol, and the water-resistance properties were evaluated. As the results, swelling and peeling-off did not appear.

Example 17

Example 17 was carried out in the same way as in Example 15 except that 0.3 g of pentaerythritol was mixed instead of 1 g of erythritol, and the water-resistance properties were evaluated. As the results, swelling and peeling-off did not appear. Further, the surface of the electrically conductive polymer film changed to hydrophobic surface which had water repellency.

Example 18

Example 18 was carried out in the same way as in Example 15 except that 0.3 g of pentaerythritol as well as 1 g of erythritol was mixed and the water-resistance properties were evaluated. As the results, swelling and peeling-off did not appear. Further, the surface of the electrically conductive polymer film changed to hydrophobic surface which has water repellency.

It was found from the results of Example 10 that as for the electrically conductive polymer composition obtained by removing the dispersion medium from the electrically conductive polymer suspension containing at least one compound (A) selected from erythritol, xylitol and pentaerythritol, the appearance (color and transparency) changed and the water-resistance properties (swelling and peeling off from the glass substrate) drastically improved. In particular, as for the electrically conductive polymer film containing pentaerythritol, the surface has changed to the hydrophobic surface and, hence, such specific change was confirmed. It is understood from this specific change that pentaerythritol has different back-bone structure from that of erythritol having equal hydroxyl groups and, in turn, the difference causes the specific change.

Additionally, from the FTIR analysis results, a peak of hydroxyl group disappeared and, thereafter, the similar new spectrum appeared. Accordingly, it is understood that an organic structure changes by interaction with polyacid.

In Examples 11 to 13 in which the polyacid component was used, the polysulfonic acids having different main chains from each other exhibited the same appearance change. Accordingly, it is implied that there are interactions with the sulfonic acid group and it is understood that the main chains are not particularly limited. Similarly, in Example 14 in which the polyacrylic acid was used, the same appearance change was exhibited. Accordingly, it is implied that there are interactions with the carboxylic acid group, as in the sulfonic acid group, and it is understood that the carboxylic acid may be used.

In Examples 11 and 12, from the results of the visual appearance changes of the composition at near the melting temperatures of erythritol and pentaerythritol, it was found that the visual appearance changed in temperature range above the melting temperature. Further, it was confirmed that this appearance change corresponded to those of the electrically conductive polymer films (in Examples 6 and 8) which are written in Table 2 of Example 10.

In Examples 15 to 17, the water-resistance improved, and, in particular, the surface of the electrically conductive polymer film containing pentaerythritol especially changed to the hydrophobic surface.

In Example 18 in which both of erythritol and pentaerythritol were added, the surface of the electrically conductive polymer film changed to the hydrophobic surface which had water repellency, as in the case that only pentaerythritol was added.

In those ways, it was apparent that by adding at least one compound (A) selected from erythritol, xylitol and pentaerythritol, the electrically conductive polymer composition in which the appearance (color and transparency) change characteristics and water-resistance properties drastically improves can be provided.

LIST OF COMPONENTS

1: anode body
2: dielectric layer
3: solid electrolyte layer
3A: second electrically conductive polymer layer
3B: first electrically conductive polymer layer
4: cathode layer
5: graphite layer
6: silver/electrically conductive resin layer

What is claimed is:

1. A solid electrolytic capacitor comprising:
a solid electrolyte layer comprising an electrically conductive polymer composition comprising dehydrated and polymerized pentaerythritol;
wherein the electrically conductive polymer composition is obtained by heating an electrically conductive polymer suspension comprising an electrically conductive polymer material comprising a dopant composed of a polyacid or a salt thereof and an electrically conductive polymer; pentaerythritol; and a dispersion medium at a temperature equal to or higher than 150° C. and less than 270° C., thereby removing the dispersion medium from the electrically conductive polymer suspension and dehydrating and polymerizing the pentaerythritol.

2. The solid electrolytic capacitor according to claim 1, further comprising an anode body made of a valve action metal, and a dielectric layer formed on the surface of the anode body, wherein the solid electrolyte layer is formed on the dielectric layer.

3. The solid electrolytic capacitor according to claim 1, wherein the electrically conductive polymer material comprises, as the dopant, a polysulfonic acid or a polycarboxylic acid.

4. The solid electrolytic capacitor according to claim 3, wherein the electrically conductive polymer material comprises, as the dopant, a polystyrene sulfonic acid or a polyester sulfonic acid.

5. The solid electrolytic capacitor according to claim 1, wherein the electrically conductive polymer material comprises, as the electrically conductive polymer, a polymer obtained by polymerizing at least one monomer selected from a group consisting of pyrrole, thiophene, aniline and derivatives thereof.

6. The solid electrolytic capacitor according to claim 2, wherein the valve action metal is at least one selected from the group consisting of aluminum, tantalum and niobium.

* * * * *